(12) United States Patent
Stoesser

(10) Patent No.: US 11,549,326 B2
(45) Date of Patent: Jan. 10, 2023

(54) DRIVE SYSTEM FOR TUBING ROTATOR

(71) Applicant: EVOLUTION OIL TOOLS INC., Calgary (CA)

(72) Inventor: Emery Stoesser, Calgary (CA)

(73) Assignee: EVOLUTION OIL TOOLS INC, Calgary (CA)

( * ) Notice: Subject to any disclaimer, the term of this patent is extended or adjusted under 35 U.S.C. 154(b) by 30 days.

(21) Appl. No.: 17/133,017

(22) Filed: Dec. 23, 2020

(65) Prior Publication Data

US 2021/0189825 A1 Jun. 24, 2021

Related U.S. Application Data

(60) Provisional application No. 62/952,960, filed on Dec. 23, 2019.

(51) Int. Cl.
*E21B 33/04* (2006.01)
*F16H 1/16* (2006.01)

(52) U.S. Cl.
CPC ........... *E21B 33/0415* (2013.01); *F16H 1/16* (2013.01)

(58) Field of Classification Search
CPC .............................. E21B 33/0415; F16H 1/16
See application file for complete search history.

(56) References Cited

U.S. PATENT DOCUMENTS

| | | | | |
|---|---|---|---|---|
| 3,771,118 A * | 11/1973 | Lichte, Jr. | ............... | E21B 47/12 33/312 |
| 5,427,178 A * | 6/1995 | Bland | ................... | E21B 43/127 166/78.1 |
| 6,102,828 A * | 8/2000 | MacKenzie | ............. | E21B 34/16 475/263 |
| 10,780,798 B2 * | 9/2020 | Falster | ................. | B60N 2/0284 |
| 11,131,169 B2 * | 9/2021 | Wright | ............... | E21B 33/0415 |
| 2020/0132507 A1* | 4/2020 | Osada | ....................... | G01D 5/14 |
| 2021/0017829 A1* | 1/2021 | Wright | ............... | E21B 33/0415 |
| 2021/0140514 A1* | 5/2021 | Smemo | ................... | F16H 1/225 |

* cited by examiner

*Primary Examiner* — Aaron L Lembo
(74) *Attorney, Agent, or Firm* — Kunzler Bean & Adamson

(57) ABSTRACT

A tubing rotator and a drive therefor. The tubing rotator includes an input shaft to a tubing rotator gear; an electric motor including an output shaft; and a plurality of worm drives arranged in series and configured to (i) receive input from the electric motor and (ii) output torque to the input shaft of the tubing rotator. The worm drives may be identical speed reducers, such as with an input to output reduction ratio of from 25:1 to 40:1.

15 Claims, 13 Drawing Sheets

Slotted Embodiment

DRIVE SYSTEM FOR TUBING ROTATOR

FIELD OF THE INVENTION

The invention is directed to tubing rotators for wellbore operations and, in particular, drive systems for tubing rotators.

BACKGROUND OF THE INVENTION

Tubing rotators are used in wellbore operations to reduce problematic wear on production strings. Tubing rotators are employed at the wellhead incorporated with the string hanger.

Tubing rotators are sometimes driven to rotate by electric drives. Because the tubing rotator must be rotated at a very slow rotational speed such as, for example, less than five rotations, for example 1-2 rotations per day (RPD), the motor output rpm must be significantly reduced before the torque is applied to the tubing rotator. Prior electric drives 10 for tubing rotators, such as the ones shown in FIGS. 1A and 1B, employ a unique electric motor 12 with a geared output shaft, an inline splined input reducer 14 and a worm drive reducer 16. Such a drive system with a 400:1 inline splined input reducer and a 60:1 right angle worm drive reducer results in an rpm reduction ratio of about 24,000:1 from motor 12 to the input shaft 18 of a gear within the housing of the tubing rotator 20. As such, a string coupled to the tubing rotator can be rotated while it is hung at the wellhead 8 from the string hanger 21.

These prior drive systems have numerous disadvantages, for example, they require a unique electric motor and, therefore, cannot operate with a standard keyed motor. Also, they have a length/size and installation limitations that cause them to be cumbersome, such that they sometimes crowd or are incompatible with other equipment on the wellhead such as lockdowns 23 or lines or other equipment that are on the working ports of the wellhead.

SUMMARY

A tubing rotator and electric drive system therefor have been invented.

In accordance with one embodiment, there is provided an electric drive system for a tubing rotator comprising: an electric motor including an output shaft; and, a plurality of worm drives arranged in series and configured to receive input from the electric motor and to output torque to an input shaft of the tubing rotator.

In accordance with another embodiment, there is provided a tubing rotator comprising: an input shaft to a tubing rotator gear; an electric motor including an output shaft; and, a plurality of worm drives arranged in series and configured to (i) receive input from the electric motor and (ii) output torque to the input shaft of the tubing rotator.

In accordance with another embodiment, there is a method for mounting a drive system onto a tubing rotator, the drive system including: an electric motor including an output shaft; and a plurality of worm drives arranged in series and configured to receive input from the electric motor and output torque to an input shaft of the tubing rotator, wherein the plurality of worm drives includes a first worm drive coupled to the electric motor, a second worm drive couplable to the first worm drive and a final worm drive couplable between the second worm drive and the input shaft; and the method comprising: selecting a mount position of the final worm drive relative to the tubing rotator input shaft such that a worm input shaft of the final worm drive is oriented to extend out either sideways or downwardly; and selecting an orientation for the second worm drive to orient a worm input shaft of the second worm drive to extend in a selected direction while a worm gear output shaft of the second worm drive is coupled to the final worm drive.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

The invention will be better understood by reference to the attached drawings, in which.

DESCRIPTION OF VARIOUS EMBODIMENTS

Figure 1A:
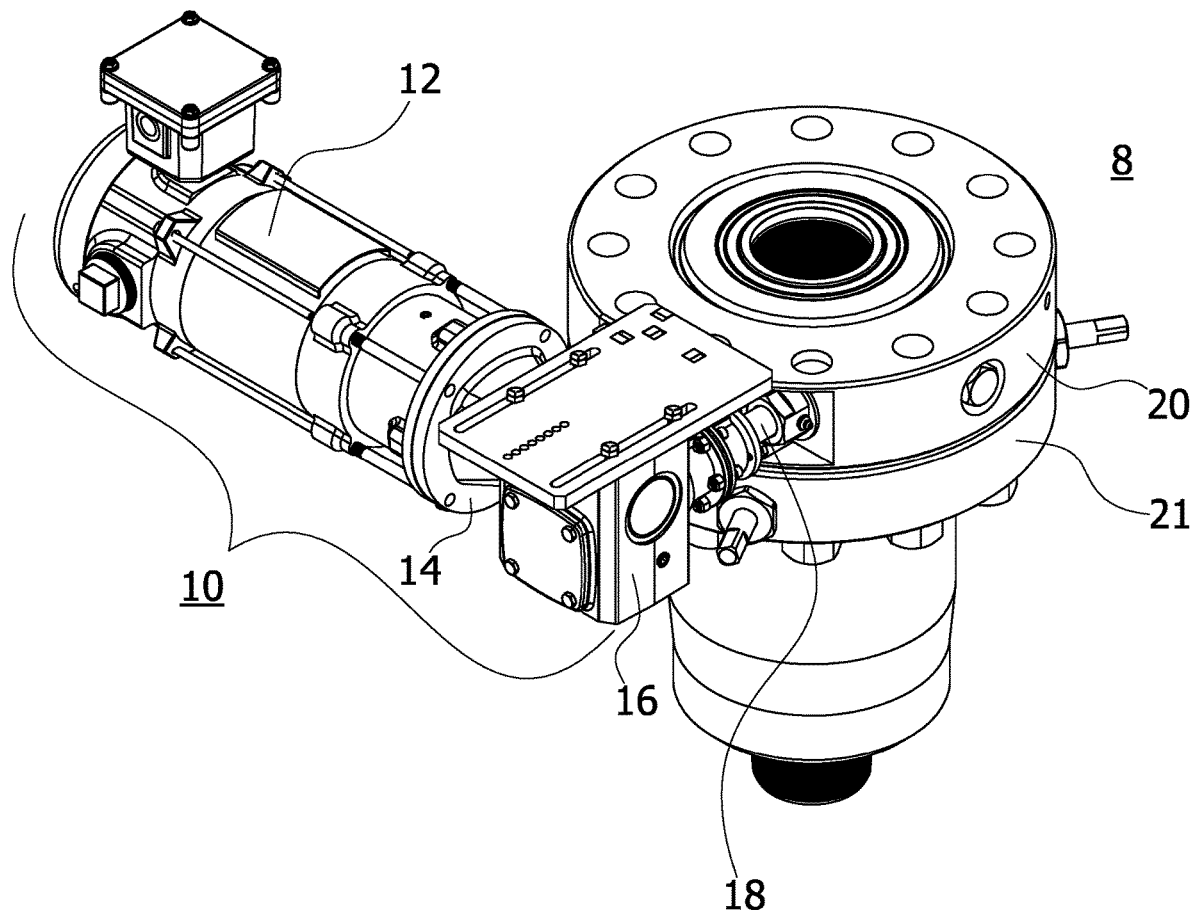
FIG. 1A is a top, side perspective view of a prior art electric drive system connected to a string hanger and tubing rotator.
Figure 1B:
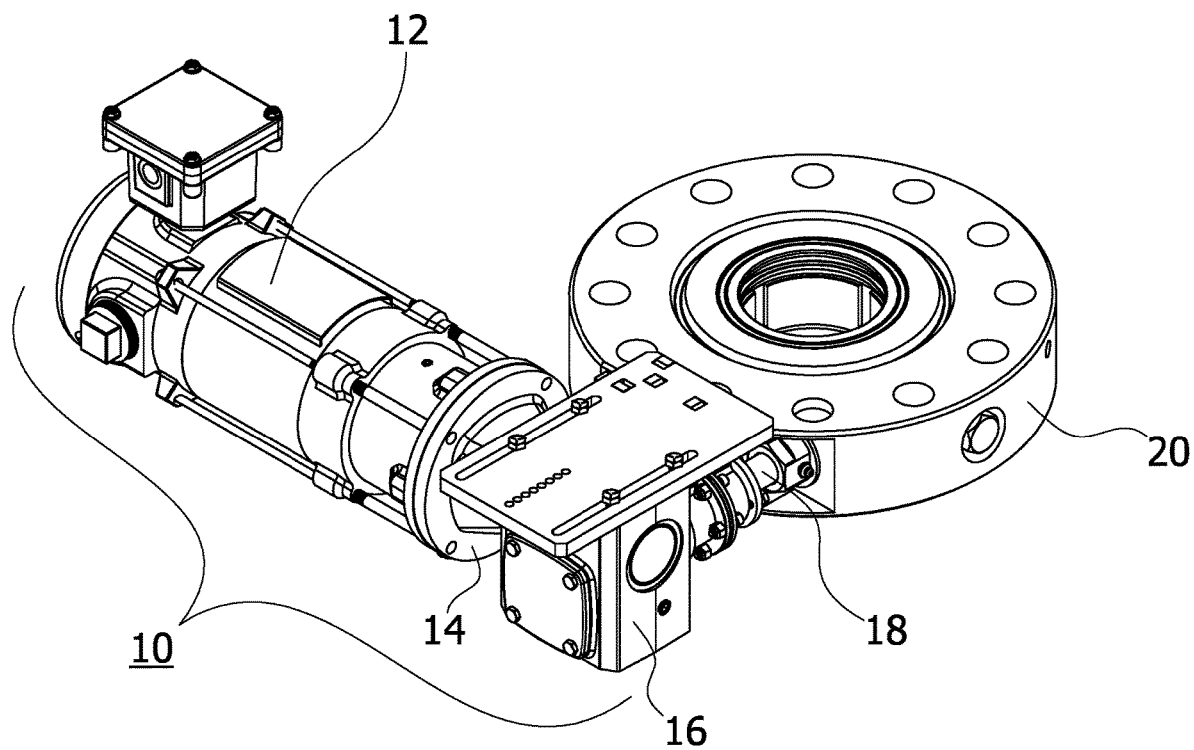
FIG. 1B is a top, side isometric view of a prior art electric drive system connected to a tubing rotator.

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects. The drawings are not necessarily to scale and in some instances, proportions may have been exaggerated in order more clearly to depict certain features.

Throughout the drawings, from time to time, the same number is used to reference similar, but not necessarily identical, parts.

With reference to FIGS. 2A to 4, an electric drive system 22 for a tubing rotator 20 has been invented that includes an electric motor 24 including an output shaft 24a; a plurality of, such as for example three, worm drives 26, 28, 30 arranged and coupled in series and configured to receive input from the electric motor. The worm drives reduce the input rotational drive from the motor to generate an output torque at an output shaft 30b' from drive 30 that is applied to an input shaft 18, and thereby to a gear within the housing, of the tubing rotator 20.

While other motors could be used, motor 24 may be a standard keyed motor. A standard keyed motor can be sourced easily, should one be required for replacement and repair. In some applications, the motor has an explosion proof configuration and, for example, may be Class I, Div I. The motor may have a mounting plate 33 to facilitate installation to corresponding mounting brackets, such as a bracket on the wellhead or tubing rotator.

There may be a shear coupling 38 between the output shaft 30b' of the final drive 30 and the tubing rotator input shaft 18.

Employing a plurality of worm drives 26, 28, 30 arranged in series is a surprisingly efficient and flexible solution for fitting the drive system onto a tubing rotator and achieving a desired rotational reduction from the motor to the tubing rotator. Arranged in series means that the worm drives are coupled output-shaft-to-input-shaft one after the other for reduced rotational transmission. In particular, the first worm drive 26 receives a rotational drive input from motor 24, reduces the rpm and outputs the reduced rotation drive to a second, and possibly final, worm drive 28. If there is a further worm drive, as shown, that second worm drive 28 reduces the rotational drive received from the first worm drive and outputs the reduced rotational drive to the next and possibly final worm drive 30. Then, the final worm drive, in this case a third drive 30, reduces the rpm and applies the torque to the tubing rotator input shaft 18.

In one embodiment, a both a flexible orientation and a desired rotational reduction from the motor to the tubing rotator is achieved by stacking three worm drives 26, 28, 30 together in series. In particular, worm drives are typically limited to up to 100:1 output reduction. Therefore, in order to achieve a useful effect, of reducing a typical output of the motor output down to 0.5 to 5 revolutions per day (RPD) at the tubing rotator, three worm drives are employed. In one embodiment, the worm drives are selected to have an input to output reduction ratio in the range of from 25:1 to 40:1. To facilitate operations, the worm drives may all be the same for example selected to all generate an identical input to output reduction ratio. With, for example, three 30:1 worm drives, an overall speed reduction of 27,000:1 is achieved (calculated as 30×30×30=27,000). The resulting rotation of the tubing using three 30:1 worm drives and a typical electric motor is about 1-2 revs per day (RPD) (RPD=Motor speed [rpm]×60 [min/hr]×24 [hr/day]/total ratio of gearboxes×ratio of tubing rotator. In the example RPD=1750× 60×24/30×30×30/70=1.33 revs/day).

Figure 2A:
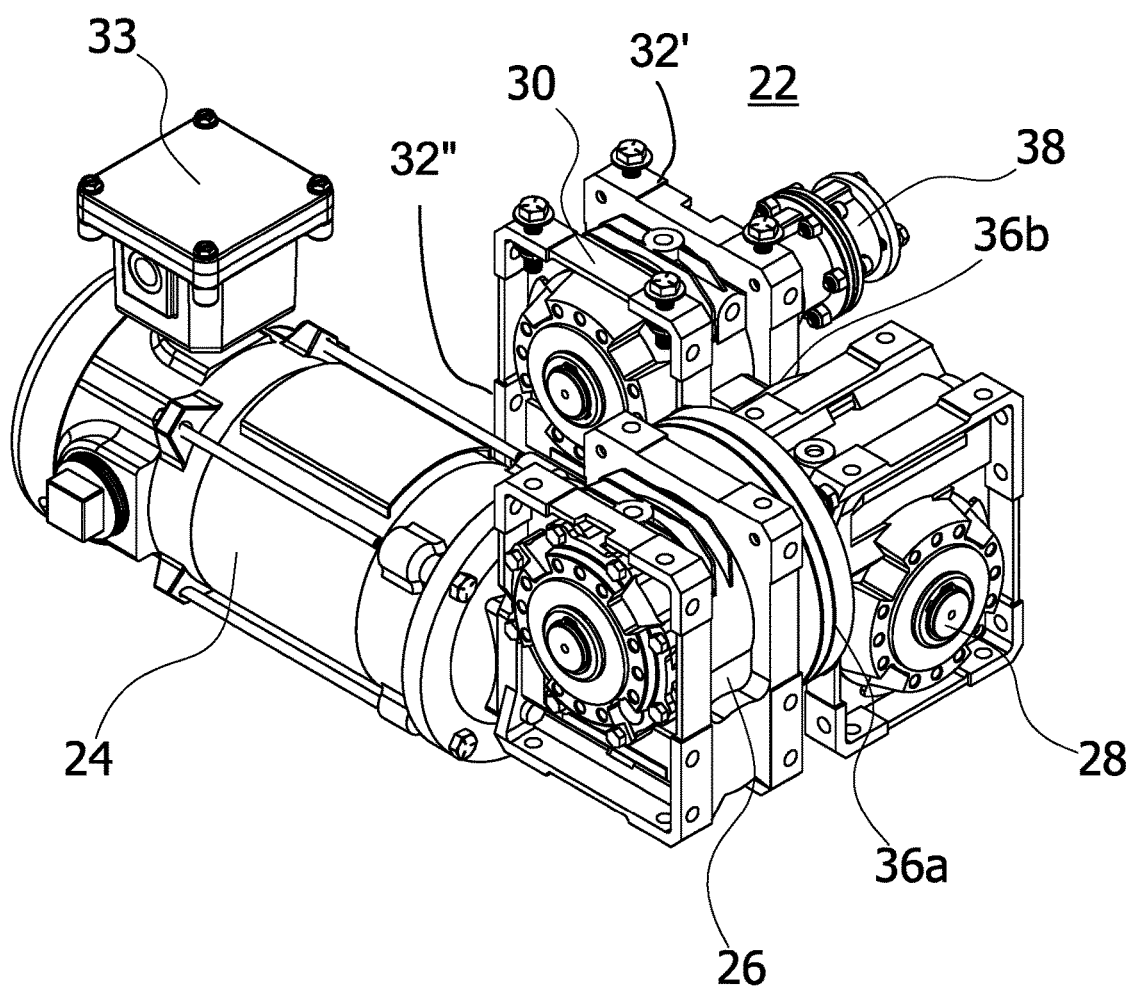
FIG. 2A is a top, side isometric view of an electric drive system for a tubing rotator.
Figure 2B:
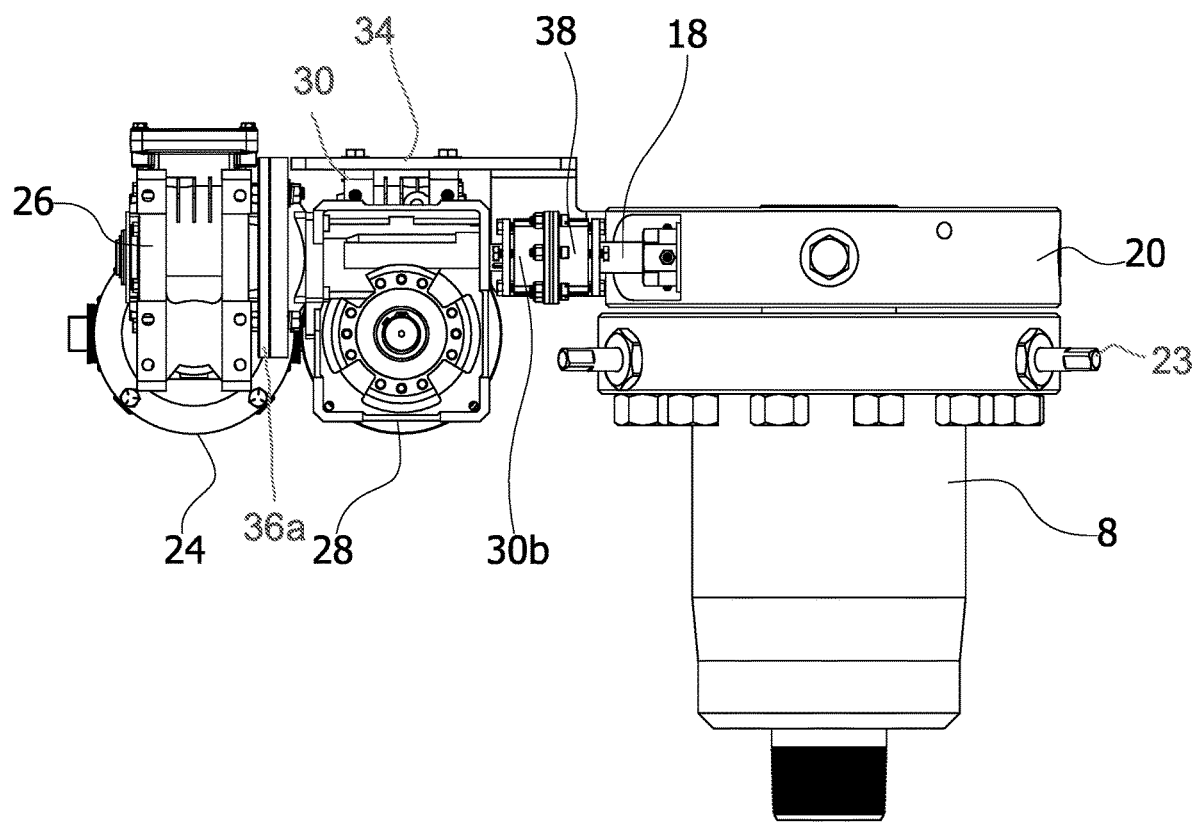
FIG. 2B is a side elevation of the drive system of FIG. 2A installed on a wellhead to input drive to a tubing rotator.
Figure 2C:
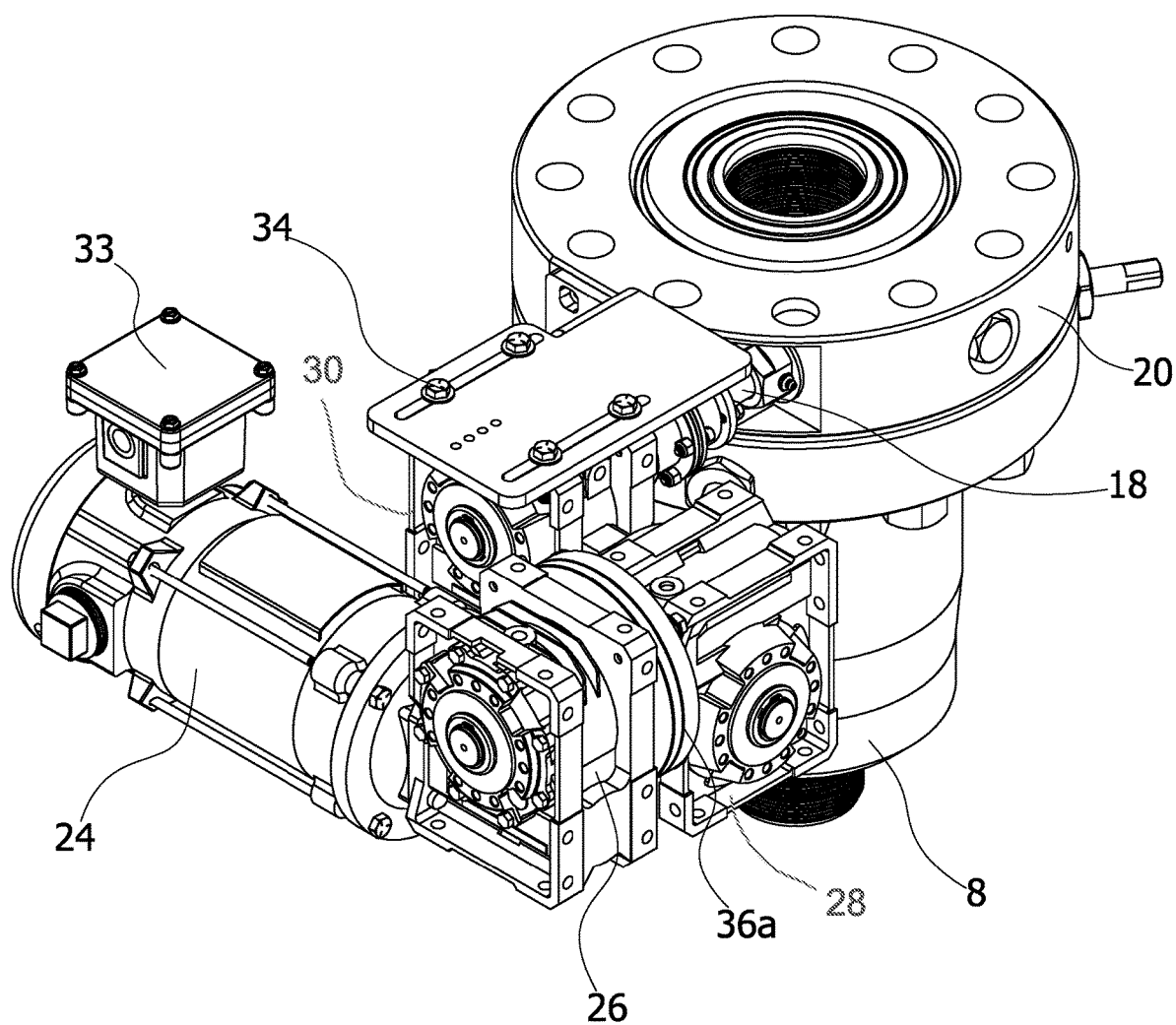
FIG. 2C is a top, side isometric view of the wellhead of FIG. 2B.
Figure 2D:
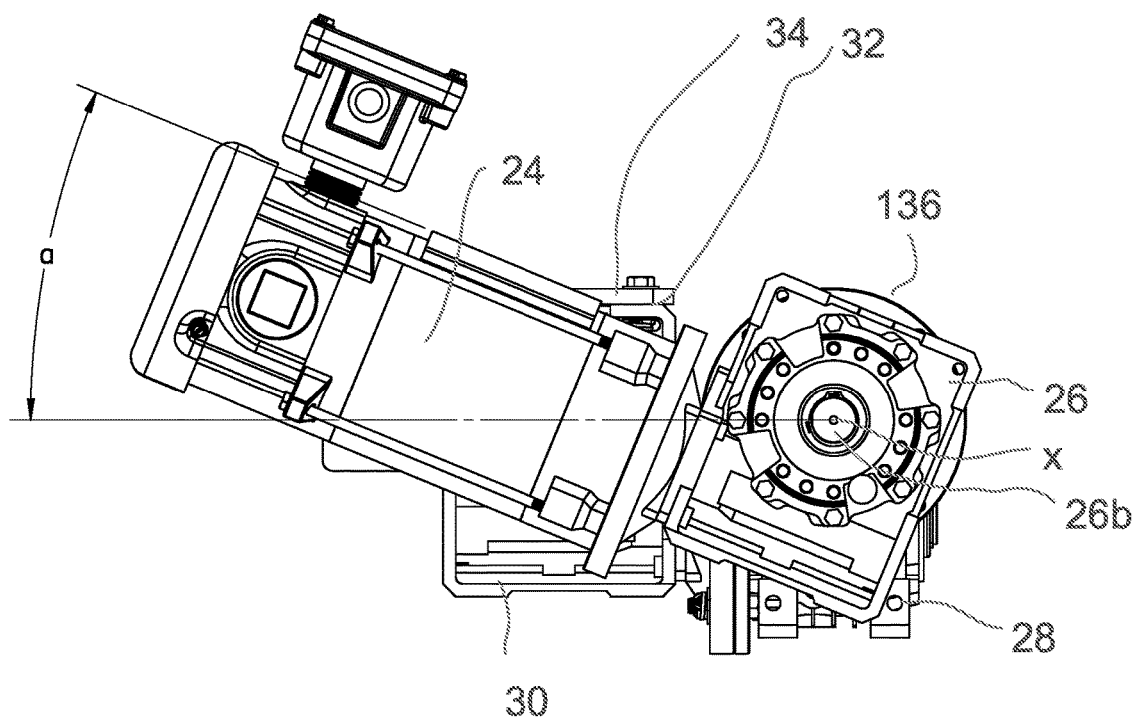
FIG. 2D is a side elevation of an electric drive system similar to FIG. 2A but showing rotational adjustment between worm drives.
Figure 2E:
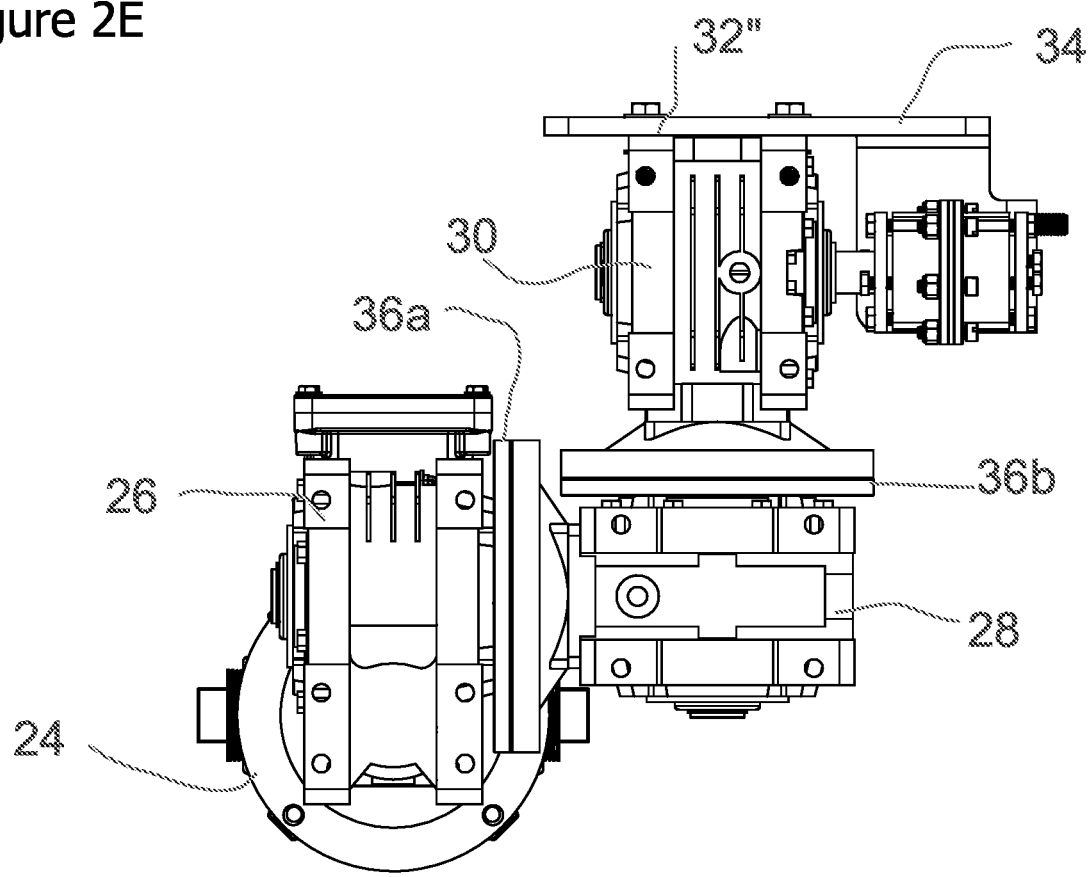
FIG. 2E is a side elevation of an electric drive system similar to FIG. 2A but showing an underslung arrangement between the second and third worm drives.
Figure 2F:
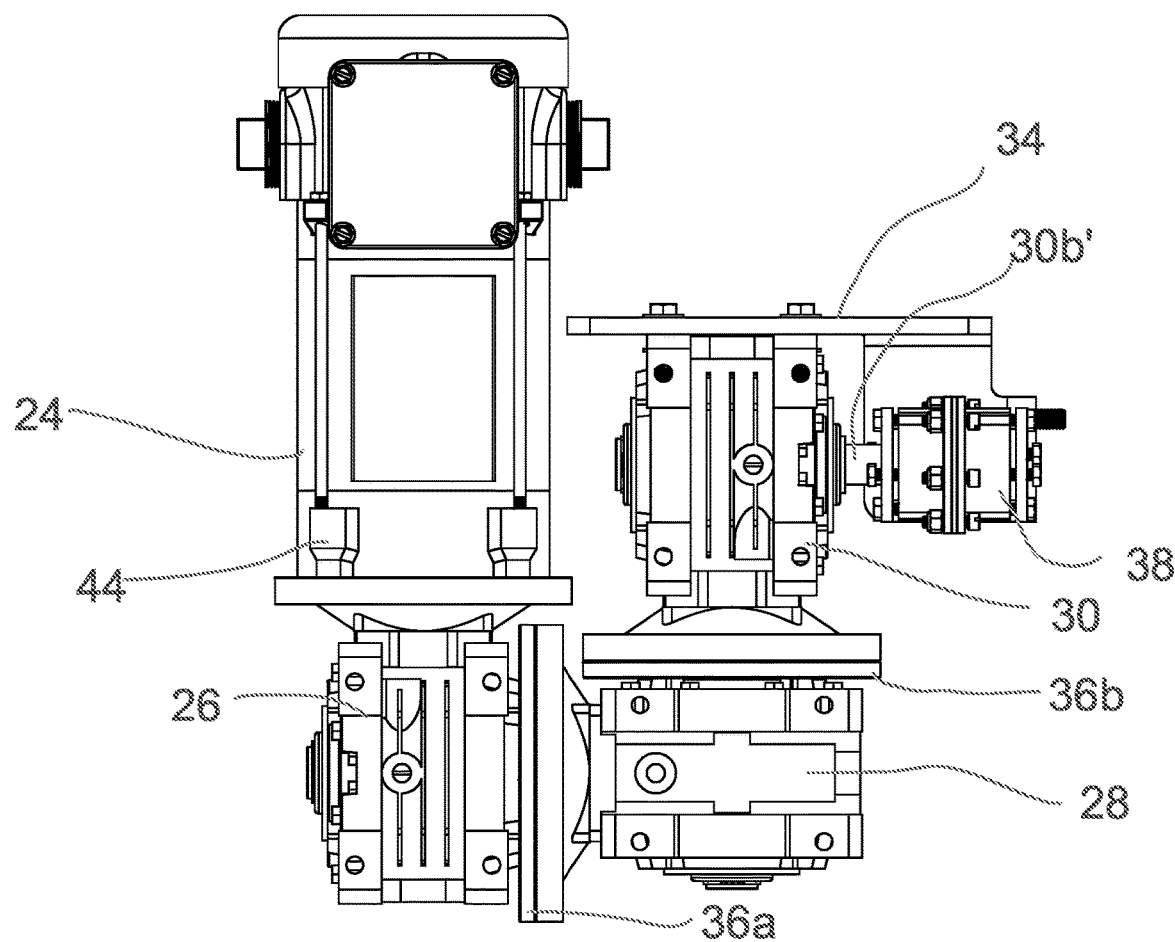
FIG. 2F is a side elevation of an electric drive system similar to FIG. 2A but showing another underslung and rotationally reconfigured arrangement of the worm drives.
Figure 3:
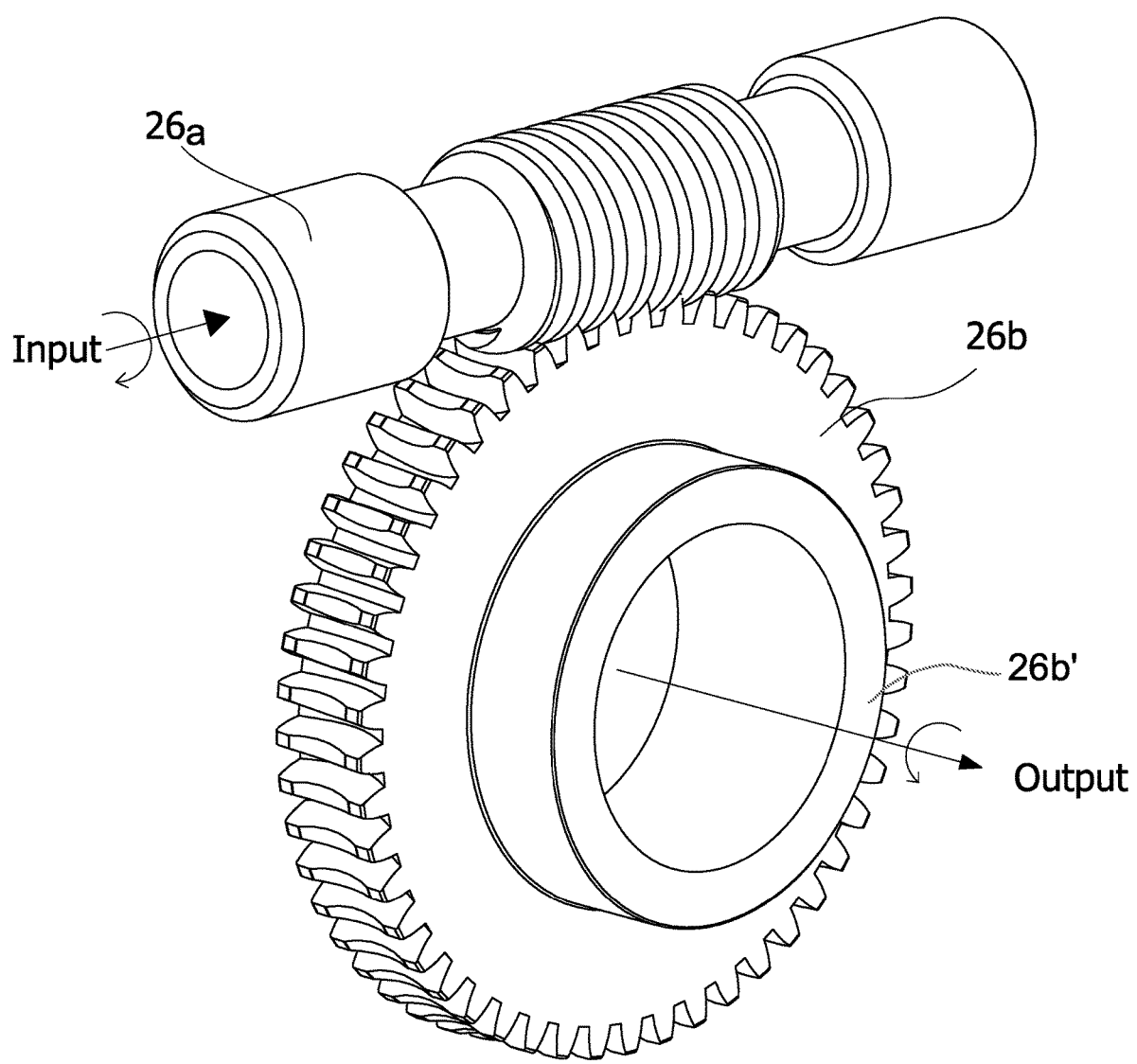
FIG. 3 is an isometric view of a worm drive useful in the present invention.

A typical worm drive is illustrated in FIG. 3. As will be appreciated, a worm drive 26 is a gear arrangement in which a worm 26a, which is an elongate gear in the form of a screw, meshes with a worm gear 26b, which is similar in appearance to a spur gear or gear wheel. The two elements are also called the worm screw and worm wheel. The terminology is often confused by imprecise use of the term worm gear to refer to the worm drive as a unit. A worm drive can reduce rotational speed and transmit higher torque from an input to worm 26a and an output from the shaft of worm gear 26b. A worm drive can transfer motion in 90° and either left or right. In the illustrated embodiment of FIGS. 2A-2F and FIG. 4, the worm drives are all right hand. All the worm drive gear reducers 26, 28, 30 can be the same model thereby reducing the number of spare parts that are needed for maintaining and repairing the tubing rotator drive system.

Figure 5A:
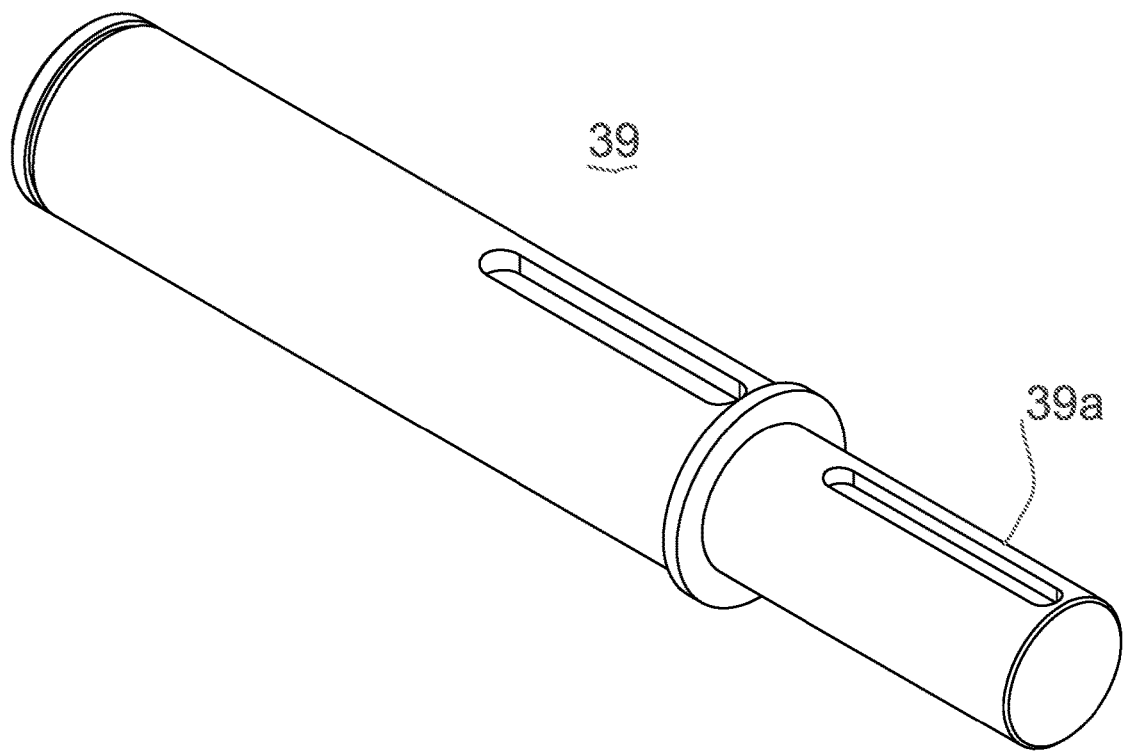
FIG. 5A is a top isometric of a gear box connector shaft useful in the present invention.

The gear boxes are coupled to ensure that the rotational output of one gear box is reliably transferred to the next gear box. In one embodiment, an adapter shaft 39 such as one shown in FIG. 5A may be employed. Shaft 39 allows the output of one box to connect directly to the input of the next box. The ends, such as end 39a, are sized both in diameter and length to fit into engagement with the input or output shafts. End 39a is configured to fit and engage in a hole in the worm input shaft of a worm drive. Adapter shaft 39 can be used between the final worm drive 30 output shaft for coupling to the shear coupling 38.

Each worm drive includes a housing or box, which houses the worm 26a and worm gear 26b. There may be a mounting surface 32 on the housing, for example with flats and bolt holes, to facilitate installation as by use of bolts to a corresponding mounting bracket 34 on the wellhead. In one embodiment, there are a plurality of mounting surfaces 32 on each worm drive, thereby allowing the worm drives to be connected to a mounting surface in various orientations. In one embodiment, a useful worm drive includes at least two mounting surfaces each of which is configured for attachment, in turn, to the same mounting bracket. For example, there may be mounting surfaces 32',32" on two sides of the housing orthogonal to the output end, which is the end from which the worm gear output shaft 30b' extends. As such, the worm drive housing can be connected with the worm input shaft 30a' in a number of different orientations relative to, and remaining properly alignable with, the rotator input shaft 18. For example, where there are two mounting surfaces orthogonal to the output shaft end of the worm drive housing, the gear drive can be connected via one of the mounting surfaces 32' to position the worm input shaft 30a' of the final, directly connected worm drive 30 facing and exposed on the right (as shown in FIGS. 2B and 2C). Alternatively, the gear drive can be connected mounting surface 32" to position the worm input shaft 30a' of the final, directly connected worm drive 30 protruding downwardly away from the rotator input shaft 18 (as shown in FIGS. 2E and 2F).

Figure 4:
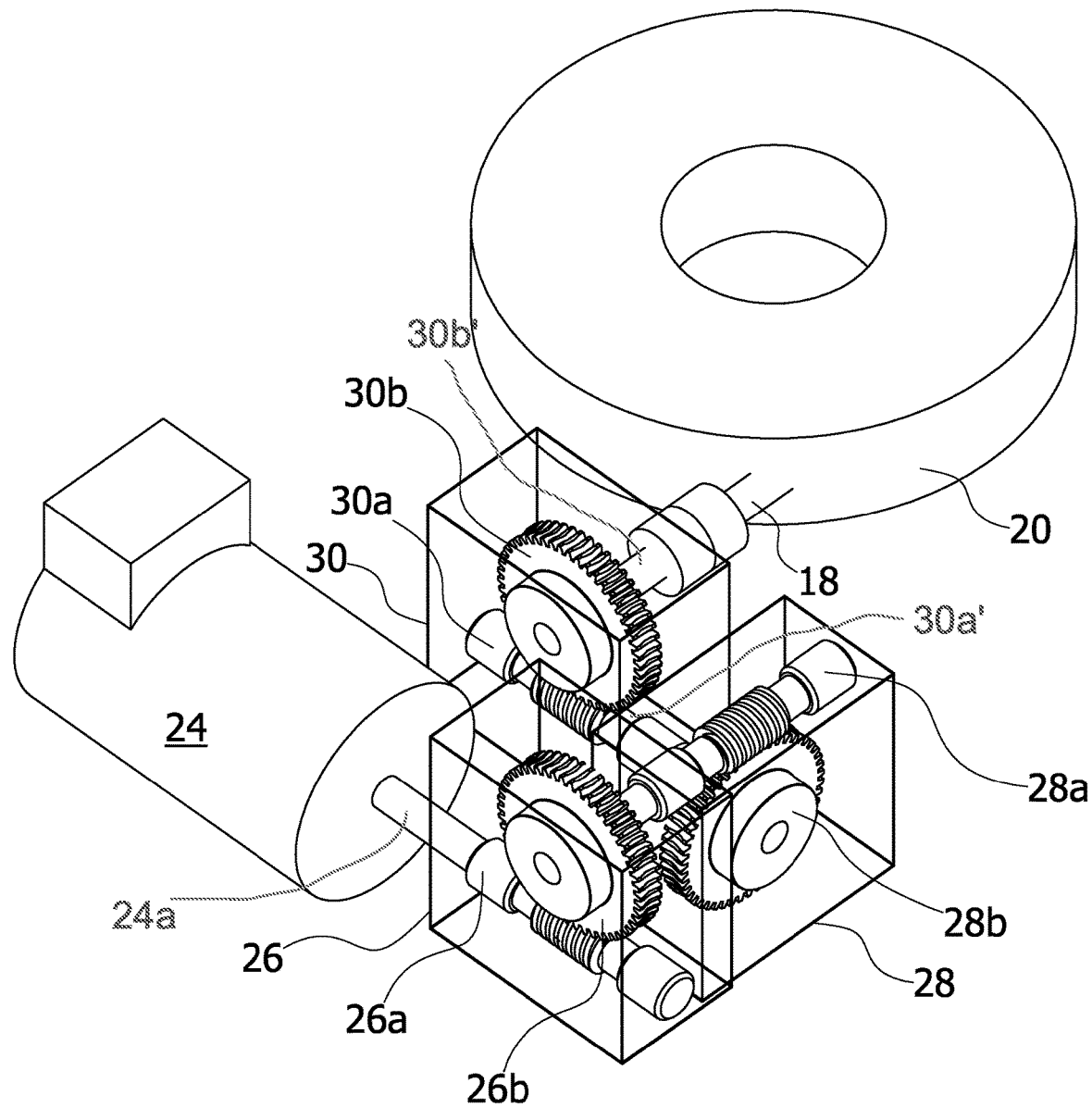
FIG. 4 is a sketch illustrating the interrelation of the drive systems of FIG. 2A.

In addition to the option for selecting the orientation of the final drive 30 relative to the mounting flange 34, the plurality of gearboxes 26, 28, 30 are readily reconfigurable and reconnectable relative to each other for further selecting the configuration and orientation of the overall drive system. Thus, the gearboxes 26, 28, 30 and electric motor can be each be coupled and oriented horizontally and/or vertically to reduce the overhung loads on the wellhead and to reduce the distance that the electric drive equipment sticks out radially from the wellhead and address space constraints. With reference to FIG. 4, for example, the worms 26a, 28a, 30a and the worm gears 26b, 28b, 30b are illustrated within each of the worm drives and the axis of rotation of all of the worms and gears of drives 26, 28 and 30 are oriented co-planar or in parallel planes, in this case all axes of rotation are horizontal or orthogonal to the long axis through the center of the tubing rotator bowl. FIG. 4 reflects the orientation of the worm drives in FIGS. 2A to 2C. However, as shown in FIGS. 2E and 2F, some gearboxes such as gearbox 28, can be underslung to create a more compact structure that does not protrude out to the right as much as, and positions the motor lower, compared to the drive system of FIG. 2B. In so doing, various axis of rotation such as the axis of rotation of the coupled worm and worm gear of worm drives 30 and 28, respectively, is vertical allowing the worm drive 28 to be mounted under drive 30. In FIG. 2F, worm drive 26 is also oriented with its worm input shaft extending substantially vertically to support motor 24 extending vertically thereabove and in front of mounting bracket 34.

While the foregoing description focuses on the coupling of adjacent worm drives to orient their input/output shafts sideways or vertically, it should be appreciated that two adjacent drives can be coupled with the housing of a first worm drive rotated at any angle relative to the housing of a second drive about the coupled input/output shafts of the two worm drives. This means that the resulting angle of other shaft of, for example, the first worm drive can extend at various angles including and between vertical and horizontal. This is shown for example in FIG. 2D, where drive 28 has its input shaft oriented substantially horizontally and the housing of drive 26 is connected at an angle α rotated from the housing of drive 28. As such, while the output gear shaft of drive 26 is aligned with the input shaft of drive 26 and is therefore substantially horizontal, the input shaft of drive 26 is rotated with the housing to thereby be tilted at the angle α from horizontal.

The worm drives may be oriented relative to each other to ensure that while their couplable output and input shafts are coaxially aligned, each of their other shafts are oriented to address weight distribution and space constraints.

Figure 5B:
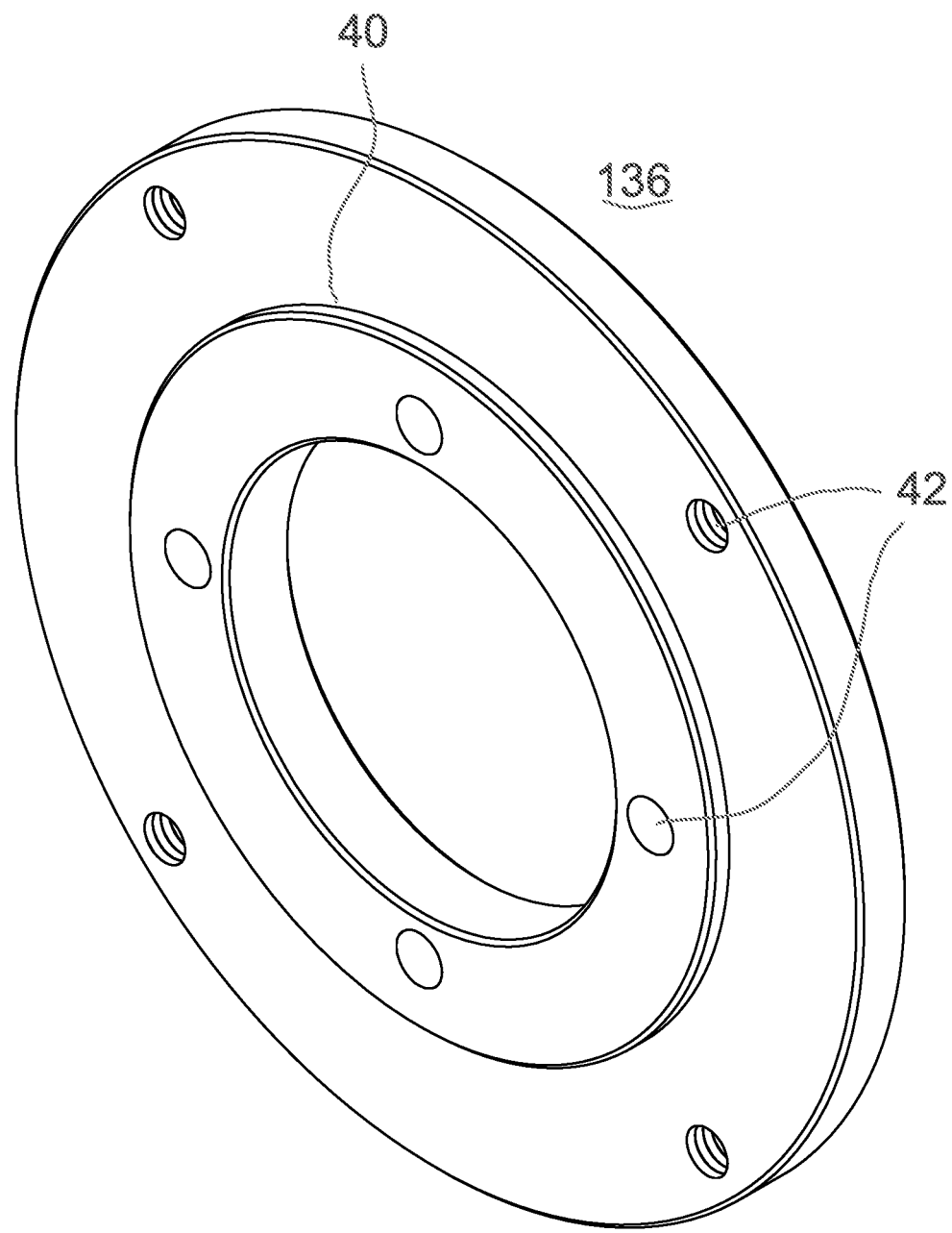
FIG. 5B is top isometric of an adapter plate useful in the present invention.

The worm drives may be oriented relative to each other by connecting the housing of one worm drive to the housing of its adjacent worm drive. Alternately, adapter plates 36a, 36b may be employed to facilitate to coupling of two worm drives together. The adapter plates may be configured to facilitate alignment between adjacent drives, such as by having piloted, for example stepped, alignment surfaces about a center hole defining the center axis thereof. The center axis of the adapter plate is the axis along which the worm and worm gear shafts can be aligned. In one embodiment, an adapter plate 136 may be used such as that shown in FIG. 5B which is generally a ring and includes a concentric stepped shoulder 40 for piloted engagement between the gear drive shafts of one worm drive connected against one annular face of the plate and a second worm drive connected against the plate's opposite annular face. Adapter plate 136 includes a plurality of bolt holes 42 through which bolts may be secured to couple the gear drives. The adapter plate may be configured with full annular symmetry such that the coupling between gear drives may be made through a range of angular orientations. For example, the adapter plate can be secured in any rotational orientation relative to the mounting plate bolt holes of the first worm drive housing and in any rotational orientation to secure bolts through bolts holes 42 onto the second worm drive to which the plate is attached. In such an embodiment for example, illustrated in FIG. 2D, adapter plate 136 may be employed to permit one gear box, such as worm drive 26, to be coupled to its adjacent worm drive 28 at a number of angles about the common axis x through output shaft 26b of drive 26 and the input shaft of drive 28, such that the input shaft of drive 26, and thereby the long axis of motor 24, are oriented at an angle α relative to horizontal. In FIG. 2D, adapter plate 136 is secured between drives 26 and 28 to orient motor at an angle α tilted upwardly from drive 26. For example, the adapter plate 136 can be attached between drives 26, 28 with 16 angular orientations, separated by 22.5°.

Figure 5C:
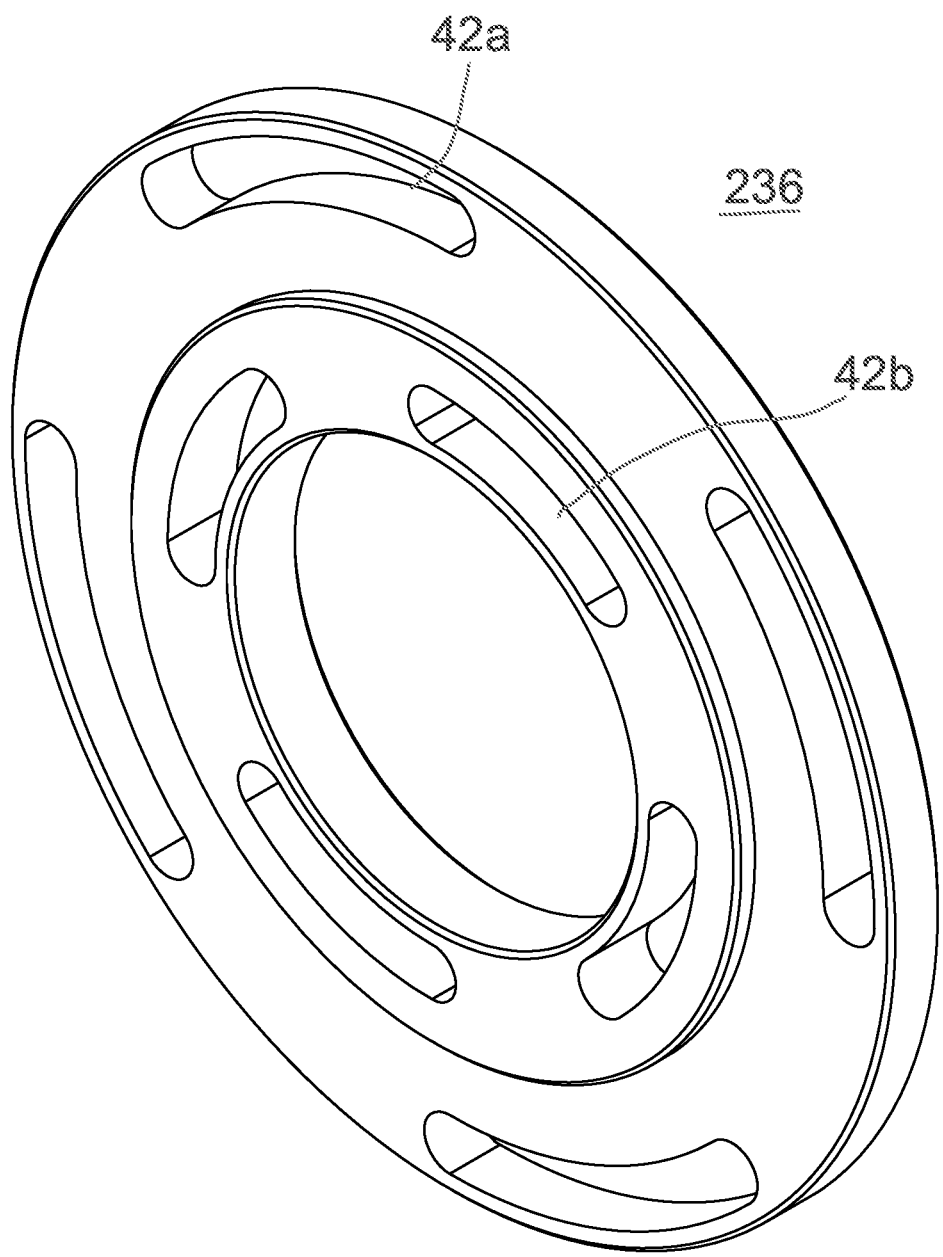
FIG. 5C is top isometric of another adapter plate useful in the present invention.

FIG. 5C illustrates a slotted adapter plate 236, which permits substantially unlimited angular mount orientations around the connected shafts of two drives, which pass though the center point of the plate. Adapter plate 236 includes a plurality of arcuate inner slots 42a through which the plate receives fasteners such as bolts to connect it to a worm drive housing on one side and a plurality of arcuate second slots 42b through which the plate is connected to a second drive on its opposite side. The slots 42a and 42b each extend concentrically relative to the plate center point, such that when connector bolts are passed through the slots from each drive, the drives can be rotated about the center point until a selected relative rotation is achieved. Then the bolts can be tightened to set that selected orientation.

In addition, the motor may have a mount arrangement 44 that also permits various, such as four possible mount rotational positions about its drive shaft axis, to first worm drive 26.

In operation, the drive system can be configured to be mounted on the tubing rotator and to engage on its input shaft 18. The mount position of the final worm drive on the tubing rotator, can be selected to either orient the final worm drive's input shaft sideways (substantially horizontally extending) or protruding downwardly (substantially vertically in an underslung position). In addition, the operator may rotationally select the coupling orientation between at least some of the plurality of worm drives. In one embodiment, the method of configuring the drive system may include selecting the orientation of a first or a second worm drive of the plurality of worm drives to orient its worm input shaft to extend in a selected direction, for example, at an angle from sideways to vertically and/or at an angle that is extending left or right or extending directly radially out relative to an outer curvature of the tubing rotator. Such a step may select the orientation of a long axis of the motor, if the motor is connected to the worm input shaft of the oriented worm drive. Regardless, selecting the orientation of the first worm drive relative to the second worm drive, relative to the aligned axis of their coupled drive shafts, orients the motor at a particular position.

The present drive system allows the drive system to be selectively oriented through multiple degrees of freedom to customize the position of the motor and each of the plurality of gear boxes relative to the tubing rotator on which the drive is installed. As such, compared to prior art systems, this drive system minimizes interference with the equipment on the wellhead. The present drive system, therefore, can be oriented to be clear of flow lines, lockdowns, other wellhead equipment, and even the ground. In addition, the use of a standard keyed motor and multiple, possibly identical, gear drives facilitates sourcing of parts and inventory management.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An electric drive system for a tubing rotator comprising:
   an electric motor including an output shaft;
   a plurality of worm drives arranged in series and configured to receive input from the electric motor and output torque to an input shaft of the tubing rotator, wherein the plurality of worm drives includes a first worm drive coupled to the electric motor, a second worm drive coupled to the first worm drive and a third worm drive coupled between the second worm drive and the input shaft; and
   a rotationally selectable adapter plate between the first worm drive and the second worm drive, the rotationally selectable adapter plate configured to permit at least two mounting positions between the first worm drive and the second worm drive while a worm gear output shaft of the first worm drive and a worm input shaft of the second worm drive are coaxially coupled.

2. The electric drive of claim 1 wherein the electric motor is a keyed motor.

3. The electric drive of claim 1 wherein the plurality of worm drives are identical.

4. The electric drive of claim 1 wherein the plurality of worm drives result in an output rotation at the tubing rotator of 0.5-5 revolutions per day.

5. The electric drive of claim 1 wherein the plurality of worm drives each have an input to output reduction ratio of from 25:1 to 40:1.

6. A method for mounting a drive system onto a tubing rotator, the drive system including:
   an electric motor including an output shaft; and
   a plurality of worm drives arranged in series and configured to receive input from the electric motor and output torque to an input shaft of the tubing rotator, wherein the plurality of worm drives includes a first worm drive coupled to the electric motor, a second worm drive couplable to the first worm drive and a final worm drive couplable between the second worm drive and the input shaft; and
the method comprising:
   selecting a mount position of the final worm drive relative to the tubing rotator input shaft such that a worm input shaft of the final worm drive is oriented to extend out either sideways or downwardly;
   selecting an orientation for the second worm drive to orient a worm input shaft of the second worm drive to extend in a selected direction while a worm gear output shaft of the second worm drive is coupled to the final worm drive; and
   selecting a coupling orientation between the first worm drive and the second worm drive.

7. The method of claim 6 wherein selecting the orientation of the second worm drive dictates the angle at which the long axis of the motor extends relative to the tubing rotator.

8. The method of claim 6 wherein selecting a coupling orientation includes selecting a long axis of the motor to be at an angle from horizontal to vertical.

9. The method of claim 6 wherein selecting the orientation includes selecting a rotational position of an adapter plate between the second worm drive and the final worm drive.

10. A tubing rotator comprising:
    an input shaft to a tubing rotator gear;
    an electric motor including an output shaft;
    a plurality of worm drives arranged in series and configured to (i) receive input from the electric motor and (ii) output torque to the input shaft of the tubing rotator, the plurality of worm drives including a first worm drive coupled to the electric, a second worm drive coupled to the first worm drive and a third worm drive coupled between the second worm drive and the input shaft; and
    a rotationally selectable adapter plate between the first worm drive and the second worm drive, the rotationally selectable adapter plate configured to permit at least two mounting positions between the first and the second worm drives while a worm gear output shaft of the first worm drive and a worm input shaft of the second worm drive are coaxially coupled.

11. The tubing rotator of claim 10 wherein the electric motor is a keyed motor.

12. The tubing rotator of claim 10 wherein the plurality of worm drives are identical.

13. The tubing rotator of claim 10 wherein the plurality of worm drives result in rotation of the tubing rotator of 0.5-5 revolutions per day.

14. The tubing rotator of claim 10 wherein the plurality of worm drives each have an input to output reduction ratio of from 25:1 to 40:1.

15. A method for mounting a drive system onto a tubing rotator, the drive system including:
    an electric motor including an output shaft; and
    a plurality of worm drives arranged in series and configured to receive input from the electric motor and output torque to an input shaft of the tubing rotator, wherein the plurality of worm drives includes a first worm drive coupled to the electric motor, a second worm drive couplable to the first worm drive and a final worm drive couplable between the second worm drive and the input shaft; and
the method comprising:
    selecting a mount position of the final worm drive relative to the tubing rotator input shaft such that a worm input shaft of the final worm drive is oriented to extend out either sideways or downwardly; and
    selecting an orientation for the second worm drive to orient a worm input shaft of the second worm drive to extend in a selected direction while a worm gear output shaft of the second worm drive is coupled to the final worm drive, wherein selecting the orientation includes selecting a rotational position of an adapter plate between the second worm drive and the final worm drive.

* * * * *